3,317,346
MODIFICATION OF STARCH
William H. Kibbel, Jr., Pennington, and John J. Juhasz, Carteret, N.J., assignors to FMC Corporation, New York, N.Y., a corporation of Delaware
No Drawing. Filed July 24, 1964, Ser. No. 385,054
6 Claims. (Cl. 127—70)

This invention relates to the modification of starch, and particularly to the treatment of starch to provide a starch product which has a salve-like, or short consistency when pasted with water, yet does not gel or otherwise undergo marked viscosity changes upon standing.

Aqueous starch slurries prepared from uncooked starch are thin, milky fluids. Upon being heated these slurries reach a temperature at which they become salve-like, viscous pastes. These pastes are easily handled, being readily stirred, poured and spread without being sticky and forming stringy masses, and thus are very useful in applications such as paper and textile sizing, preparation of food products, and the like. In this condition they are known as "short" pastes.

However, this salve-like paste is not stable, upon continued heating going through several further modifications. It first becomes quite cohesive and rubbery, such that it is difficult to handle, tending to stick together in stringy masses when it is attempted to spread or otherwise use it. Further heating or agitation of the paste causes it to become quite thin, likely due to breakdown of the starch granules. This changeability of starch pastes has created serious problems in their use, and users for many years have attempted to solve the problem of modifying starch to improve its properties and provide for uniformity under changing environmental conditions.

The most widely used modification has consisted of oxidative treatment of the starch, employing sodium hypochlorite, although occasionally hydrogen peroxide, other active oxygen compounds and other oxidants have been used for this purpose. Treatment with sodium hypochlorite and other previously used oxidizing agents has produced a starch which upon being pasted is quite thin.

While this method of modifying starch has provided starches which are useful for some purposes, it remains desirable to provide an easily handled and used modified starch which forms stable, salve-like and short pastes with water. This type of product may be provided through use of sodium hypochlorite together with certain so-called inhibitors. This method, as taught in U.S. Patent 2,317,752, employs any of a large number of additives together with the usual sodium hypochlorite starch-treating agent. The method suffers the disadvantage, however, that it requires use of carefully controlled mixtures of treating agents, whose exact compositions must be worked out carefully for different starches, both as to amounts of the multiple ingredients and proportions of each relative to the other.

It is a feature of this invention to provide a method of modifying starch in a manner to cause it to produce salve-like pastes which are stable against marked viscosity changes and gelation under a variety of environmental conditions, such as temperature changes and long standing.

It is a further feature of this invention to provide such a process which requires use of only one treating agent.

It has now been found that dichlorinated cyanuric compounds, namely dichlorocyanuric acid and the alkali metal and alkaline earth metal salts of dichlorocyanuric acid, modify starches to provide starch products capable of forming salve-like, short pastes which are stable against marked viscosity changes and gelation over long periods of time and under changing environmental conditions. The effectiveness of the dichlorocyanuric compounds is quite surprising, since the common trichlorocyanuric compound, trichlorocyanuric acid, provides modified starches which gel upon standing.

The modification process of this invention is carried out by providing an aqueous starch slurry containing about 20 to 50 percent by weight of starch, stirring into the slurry an amount of a dichlorinated cyanuric compound to provide therein 0.5 to 5.0 percent by weight available chlorine based on the dry weight of the starch, and continuing the treatment of the slurry for 2 to 4 hours at a temperature of 90° to 175° F. The reaction preferably is carried out at a pH of 8.0 to 9.0, and preferably a pH of 8.2 to 8.5, and following completion of the reaction residual chlorine is destroyed with any well-known antichlor, such as sodium metabisulfite. The starch product slurry may be pasted directly by application of heat, or the starch may be recovered as a solid product, preferably with several water washings. The starch then is dried, for example by heating it at on the order of up to 180° F., at ambient or reduced pressure, for several hours.

Low solids content pastes of the modified starch produced by the above method have salve-like, short consistencies and are easily handled. Furthermore, these pastes are stable upon further heating, or storage for periods as long as several months or more, not tending to increase markedly or otherwise change in viscosity or to gel. Furthermore, these pastes are resistant to moulding upon standing, contrary to the behavior of untreated starches or starches treated with the typical prior art modification agent, sodium hypochlorite. They therefore are unusually useful in food applications where stable viscosities and freedom from development of mould are desirable in products such as puddings and desserts, and in paper and textile sizing applications, adhesives and the like.

The commonly available starches, such as those derived from potatoes, corn, rice, tapioca, wheat and other sources, are converted by the present modification process to useful, even viscosity, stable starch products. They are treated by the herein process at a concentration of 20 to 50 percent by weight of dry starch in aqueous slurries.

The dichlorinated cyanuric compounds employed in the process of this invention are the dichlorinated cyanuric acids, namely dichlorocyanuric acid and the alkali metal and alkaline earth metal salts of dichlorocyanuric acid, for example, sodium dichlorocyanurate, potassium dichlorocyanurate, calcium dichlorocyanurate, magnesium dichlorocyanurate and barium dichlorocyanurate. These compounds are available as powders having varying available chlorine contents depending on the particular salt or acid employed, and having solubilities which vary as shown in the following table. The available chlorine is released even though the chlorinated cyanuric compound is not fully dissolved in the system, and accordingly even those compounds in this class which have low solubilities are effective in the herein process.

TABLE

| Compound | Available Chlorine, percent | Solubility [1] |
|---|---|---|
| Dichlorocyanuric acid | 71.6 | 1 |
| Sodium dichlorocyanurate | 64.4 | 30.6 |
| Potassium dichlorocyanurate | 60.2 | 11.5 |
| Calcium dichlorocyanurate | 65.3 | 22.6 |
| Barium dichlorocyanurate | 53.4 | 1.55 |

[1] Grams soluble in 100 ml. of water at 25° C.

The dichlorinated cyanuric compounds are employed in an amount to provide 0.5 to 5.0 percent by weight of available chlorine based on the dry weight of the starch, and all of the values presented herein are on a weight percent dry starch basis. They are added to the starch slurry either predissolved in water or directly as solids; alternatively, the two powders, namely the starch granules and the dichlorinated cyanuric compound powder, may be premixed and added to the water together.

The pH of the slurry in which the starch is treated with the dichlorinated cyanuric compound preferably is 8.0 to 9.0, and more preferably 8.2 to 8.5. Where the natural pH of the slurry is unsuitable, an alkali such as sodium hydroxide, lime, sodium carbonate or the like is added to adjust the pH to the desired level.

The temperature at which the treatment is carried out is 90° to 175° F., and preferably 100° to 150° F. Use of temperatures below 90° F. results in incomplete modification of the starch and excessive reaction times, whereas operation at above about 175 F. often results in some pasting of the starch.

The treatment of the starch is carried out for 2 to 4 hours. Operation for much less than 2 hours results in incomplete modification of the starch, while it is unnecessary to carry the treatment on for more than 4 hours since little or no advantage ensues. It will be apparent that operation at higher temperatures within the range of 90° to 175° F. shortens required treating time, whereas operation at lower temperatures within this range increases treatment time within the indicated range.

Common antichlors such as sodium metabisulfite, sodium sulfites, sodium thiosulfates and the like desirably are employed following the treatment of the starch with the dichlorinated cyanuric compound in order to destroy any residual available chlorine which might cause further modification or be harmful in subsequent use of the starch. Where the presence of the chlorine is not objectionable for end use of the starch, the antichlor treatment may be eliminated, and it is not necessary to the present invention although retention of excessive chlorine may be harmful.

The slurry resulting from the herein treatment of the starch can be pasted directly, or it can be treated for recovery of the modified starch in solid, particulate form. Pasting suitably is effected by heating the slurry at a temperature of about 200° F. for about one-half hour. Alternatively, the starch product may be obtained as the solid product.

The followiing examples are given by way of illustration of the present process only, and are not to be considered as limiting the scope thereof in any way. In these examples, the viscosities of the starch pastes were determined with a Brookfield Viscosimeter, employing a No. 3 Spindle at 100 r.p.m. The evaluations of mould were made by visual observation.

*Example 1.—Modification of potato starch using sodium dichlorocyanurate*

A slurry containing 280 g. of potato starch in 520 g. of water was treated with 19.8 g. of a sodium dichlorocyanurate containing 63.6% available chlorine. This provided 4.5% of available chlorine based on the weight of the starch. The pH of the slurry was adjusted to, and maintained at, 8.2–8.5 with dilute aqueous sodium hydroxide throughout the treatment period. The treatment was continued with stirring for 3 hours at 106° F. At the end of the treatment period the reaction mixture was treated with sufficient sodium metabisulfite to consume all excess available chlorine.

The modified starch was then washed with water, filtered and dried at 158° F. for 4 hours. A 5% solids slurry of the above modified starch in water was pasted by being heated at 200° F. for one-half hour. Immediately following pasting, and while at a temperature of 180° F., the pasted product had a Brookfield viscosity of 130 centipoises. When cooled to ambient temperature (80° F.), the paste had a viscosity of 305 centipoises. Unmodified potato starch pasted as described above had corresponding viscosities of 520 and 794 centipoises, respectively.

Pastes prepared from starch modified in the above manner had "short," smooth, salve-like and non-stringy characteristics. The pastes retained these properties and were mould-free over a period of 4 weeks. Pastes prepared from unmodified potato starch were stringy and rubbery, and gelled within one day after they were prepared; mould appeared on these gels within one week.

*Example 2.—Treatment of starch with varying amounts of dichlorocyanurate*

Starch treated as in Example 1, but with varying amounts of available chlorine from sodium dichlorocyanurate, when pasted as above exhibited and retained the above described properties. Data in Table 1 shows viscosity-temperature characteristics of the pasted, sodium dichlorocyanurate-modified starches.

TABLE I

| Modified Starch Pasted, 5% Solids | Brookfield Viscosity, cps. | |
|---|---|---|
| | 80° F. | 180° F. |
| 1% available chlorine from sodium dichlorocyanurate | 670 | 410 |
| 2½% available chlorine from sodium dichlorocyanurate | 565 | 265 |
| 4½% available chlorine from sodium dichlorocyanurate | 305 | 130 |

*Example 3.—Comparative example—Modification of potato starch with sodium hypochlorite*

Example 1 was repeated with the exception that the potato starch was modified with sodium hypochlorite used in an amount to provide 4½% of available chlorine on the dry weight of the starch. The viscosity of a paste prepared from a 5% (dry basis) slurry of the modified starch was 14 at 180° F. and 28 at 80° F.

The concentration of the paste had to be increased to a solids content of 20% by weight to provide viscosities comparable to those of 5% paste prepared from the sodium dichlorocyanurate-modified starch of Example 1. Further, the 5% solids and 20% solids pastes prepared from the sodium hypochlorite-modified starch of this Example 3 gelled in a few hours and became mouldy upon standing for 3 days.

*Example 4.—Comparative example—Modification of corn starch with trichlorocyanuric acid*

A slurry containing 210 g. of corn starch in 371 g. of water was treated with 12.3 g. of trichlorocyanuric acid containing 85% of available chlorine. This provided 5% of available chlorine based on the weight of the starch. The pH of the slurry was adjusted to, and maintained at 8.2–8.5 with dilute aqueous sodium hydroxide throughout the treatment.

The treatment was conducted with stirring for 3 hours at 106° F. At the end of the treatment, the reaction mixture was treated with sufficient sodium metabisulfite to consume excess available chlorine. The modified starch was then filtered, washed with water and dried at 158° F. for 4 hours.

A 5% (dry basis) of the above modified corn starch was pasted at 200° F. for one-half hour. This slurry gelled upon standing.

*Example 5.—Other dichlorocyanurates and dichlorocyanuric acid*

Treatment of potato starch with dichlorocyanuric acid, potassium dichlorocyanurate, and calcium dichlorocyanurate provides modified starches having viscosities and other physical properties of the same kind as the properties of such starch treated with sodium dichlorocyanurate. Starches treated with these additional dichlorocyanuric compounds have the characteristic viscosity, non-gelling and mould-resistant properties associated with starch treated with sodium dichlorocyanurate.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. The method of modifying starch to stabilize its paste viscosity and reduce its gelation tendency, comprising providing an aqueous slurry containing 20 to 50 percent by weight of starch and an amount of a dichlorinated cyanuric compound to provide 0.5 to 5.0 percent by weight of available chlorine based on the weight of the starch, said slurry having a pH of 8.0 to 9.0, and maintaining said slurry for 2 to 4 hours at 90° to 175° F. and at said pH of 8.0 to 9.0.

2. The method of claim 1 in which the slurry is maintained for 2 to 4 hours at 100° to 150° F. and at a pH of 8.2 to 8.5

3. The method of claim 1 in which the dichlorinated cyanuric compound is sodium dichlorocyanurate.

4. The method of claim 1 in which the dichlorinated cyanuric compound is potassium dichlorocyanurate.

5. The method of claim 1 in which the dichlorinated cyanuric compound is dichlorocyanuric acid.

6. The method of claim 1 in which the dichlorinated cyanuric compound is calcium dichlorocyanurate.

References Cited by the Examiner

UNITED STATES PATENTS

| | | | |
|---|---|---|---|
| 2,829,991 | 4/1958 | Evans et al. | 127—70 X |
| 3,123,502 | 3/1964 | Henry et al. | 127—70 X |

MORRIS O. WOLK, *Primary Examiner.*

E. G. WHITBY, *Assistant Examiner.*